United States Patent
Bettinger

(10) Patent No.: US 6,299,716 B1
(45) Date of Patent: Oct. 9, 2001

(54) CONFORMABLE VEHICLE COATING COMPOSITE

(76) Inventor: David S. Bettinger, 8030 Coventry, Grosse Ile, MI (US) 48138-1119

(*) Notice: Subject to any disclaimer, the term of this patent is extended or adjusted under 35 U.S.C. 154(b) by 0 days.

(21) Appl. No.: 09/292,319

(22) Filed: Apr. 15, 1999

(51) Int. Cl.$^7$ .............................. B32B 31/26; B32B 5/00
(52) U.S. Cl. .................. 156/85; 156/275.5; 428/323; 428/327; 428/343; 428/355 EP
(58) Field of Search ................ 156/84, 85, 275.5; 428/34.7, 34.9, 323, 910, 343, 327, 355 EP

(56) References Cited

U.S. PATENT DOCUMENTS

| | | | |
|---|---|---|---|
| 3,599,210 | * 8/1971 | Stander | 342/2 |
| 4,707,388 | * 11/1987 | Park et al. | 156/85 |
| 4,913,760 | 4/1990 | Benson et al. | 156/244.1 |
| 4,935,270 | * 6/1990 | Read et al. | 428/34.9 |
| 5,030,513 | 7/1991 | Hartman | 428/363 |
| 5,030,514 | 7/1991 | Hartman | 428/363 |
| 5,034,077 | 7/1991 | Pata et al. | 156/84 |
| 5,106,437 | * 4/1992 | Lau et al. | 156/51 |
| 5,134,000 | * 7/1992 | Smythe et al. | 428/34.9 |
| 5,215,824 | 6/1993 | Munro et al. | 428/473.5 |
| 5,242,751 | 9/1993 | Hartman | 428/324 |
| 5,252,155 | 10/1993 | Nowicki et al. | 156/84 |
| 5,283,592 | 2/1994 | Bogorad et al. | 343/872 |
| 5,373,305 | 12/1994 | Lepore et al. | 343/872 |
| 5,373,306 | 12/1994 | Amore et al. | 343/872 |
| 5,387,304 | 2/1995 | Berner et al. | 156/212 |
| 5,470,622 | * 11/1995 | Rinde et al. | 428/34.9 |
| 5,506,053 | 4/1996 | Hubbard | 428/402 |
| 5,538,576 | 7/1996 | Knop et al. | 156/229 |
| 5,643,676 | 7/1997 | Dobashi et al. | 428/411.1 |
| 5,700,530 | * 12/1997 | Van Beersel | 428/35.9 |
| 5,914,160 | * 6/1999 | Matsufui et al. | 428/34.9 |

* cited by examiner

Primary Examiner—Michael W. Ball
Assistant Examiner—Barbara J. Musser

(57) ABSTRACT

A conformable coating composite, comprising a heat-shrink polymeric matrix sheet embedded with low signature functional material and coated with an adhesive layer, is used for the permanent retrofit to the surface of a vehicle to reduce detection. The method of utilization comprises the steps of applying the matrix sheet, followed by thermally conforming the matrix sheet to the vehicle, and finally thermally activating the adhesive to achieve permanent coating attachment.

9 Claims, 1 Drawing Sheet

CONFORMABLE VEHICLE COATING COMPOSITE

BACKGROUND OF THE INVENTION a) Field of the Invention

The present invention relates to material and methods of using a composite stock material structurally defined sheet, with a continuous and non-uniform surface embedded with and enveloping low signature particulate material which conforms to the contour of a non-planar surface. More particularly, the present invention relates to a thermo-mechanically-worked composite polymeric matrix sheet embedded with and enveloping low signature functional material and transfer coated with adhesive for the permanent retrofitting attachment onto vehicles.

b) Description of the Prior Art

It is advantageous for modern military vehicles to be afforded a facile method and means for reducing and eliminating both radar and optical signatures to avoid detection. A low signature response, for purposes of this invention, is defined as a contrary indication of and the minimum possible spectral signature of vehicle presence when subjected to radio-frequency signals and optical detection. Radio-frequency signals (RF), for the purpose of this invention, includes signals in the range between the UHF band (30 to 300 MHz) and Ku band (26 to 40 Ghz) inclusive.

The problem with utilizing paint on military vehicles to minimize visual detection is that it is too thin to contain an effective quantity of low signature RF material.

The prior art on vehicle coating teaches about polymeric films with pigment. Dobashi, et. al., U.S. Pat. No. 5,643,676, disclose a coating of a colored polyolefin film and a pressure sensitive adhesive layer. This non-shrink film is but a temporary coating for protection during vehicle transit.

The prior art on vehicle coating teaches about thermally deformable and thermoforming polymeric films with paint/pigment. Hartman, U.S. Pat. Nos. 5,030,513, 5,030,514, and 5,242,751, discloses paint composite articles comprising thermally and vacuum deformable carrier films having an adhesive layer on one surface and a paint layer on the other surface. Knop, et. al., U.S. Pat. No. 5,538,576, disclose a paint carrier film with an adhesion enhancer applied during original equipment manufacturing of the vehicle body part. Berner, et. al., U.S. Pat. No. 5,387,304, disclose a carrier film, coated on one side with paint and on the other with an adhesive, applied by thermoforming to the automotive body part. Pata, U.S. Pat. No. 5,034,077, and Benson, et. al., U.S. Pat. No. 4,913,760, disclose paint-coated polymeric films which are applied by vacuum thermoforming the films to the vehicle body part. The problem with this prior art is that the polymeric film must be applied to the vehicle body part using molds and under vacuum at the factory.

In the prior low signature art a paint additive and component was disclosed by Hubbard, U.S. Pat. No. 5,506,053. Hubbard is only a component of paint, and paint is too thin to contain an effective quantity of low signature RF material.

The RF coatings disclosed in the prior art do not all function to reduce the RF signature. Munro, et. al., U.S. Pat. No. 5,215,824, disclose an RF-transparent blanket. Amore, et. al., U.S. Pat. No. 5,373,306, Bogorad, et. al., U.S. Pat. No. 5,283,592, and Lepore, et. al., U.S. Pat. No. 5,373,305, disclose RF-transparent sunshield films. The polyimide film being utilized is not a shrink-film.

SUMMARY OF THE INVENTION

In order to overcome the above-mentioned deficiencies and problems in the prior art, this invention teaches the utilization and installation method of a conformable coating composite, comprising a heat shrink polymeric substantially transparent matrix sheet embedded with and enveloping low signature functional material and coated with an adhesive layer, used for the retrofitting permanent attachment to the surface of a vehicle. This conformable coating composite, which can also function as a permanent protective coating for the vehicle, is installed by means of shrinking this matrix sheet onto the vehicle.

1. Objects of the Invention

A general object of this invention is to provide a means for vehicles to be afforded a variety of low signature functional materials for reducing and eliminating radar and optical signatures to avoid detection.

Another general object of this invention is to facilitate a method of utilization of liquid crystal materials for gray scale matching in order to minimize visual identification.

An additional general object of this invention is to disclose methods in order to economically produce a prefabricated, pre-wired, optically active low signature coating for vehicles.

2. Features of the Invention

In keeping with these objects and others which will become apparent hereinafter, one feature of the present invention resides, briefly stated, in the ease of retrofitting permanent attachment of the coating to the vehicle surface.

An additional feature of the present invention is that this conformable coating composite can also function as a permanent protective coating for the vehicle.

The composition of the conformable coating composite comprises:

a) a heat shrink polymeric substantially transparent matrix sheet having first and second major surfaces;

b) wherein said polymeric matrix sheet is embedded with and envelopes low signature functional material within the polymer matrix;

c) wherein said first surface of said polymeric matrix sheet possesses a transfer coated permanent adhesive layer.

In the prior art of packaging, Nowicki, et. al., U.S. Pat. No. 5,252,155, disclose a heat shrink-film coated with adhesive for applying to beverage containers. Nowicki is an original equipment manufacturing (OEM) process for small scale surfaces. The preferred embodiment of the present invention is as a coating of vehicle body parts ranging in size from 2–3 square feet up to 1000 square feet. The vehicle substrate is an automobile, ground vehicle, marine vessel and aerospace body part.

The low signature functional material comprises fine diameter carbon-containing material filaments, LCD light-shutter packets, metallic pigment, and nonmetallic colored pigment. Multiple pigments of different shades and coloration are utilized to achieve low optical signature.

In order to minimize visual identification a vehicle must be matched and contrasted to its background. The closer an objects color is to the hue of its background, the more difficult it is to perceive. Therefore LCD light-shutter packets with wiring means are applied to the vehicle to achieve this chameleon scheme. The LCD packets open or close as a shutter to show forth the pigment underneath.

A facile means of retrofitting the conformable coating composite onto a vehicle substrate comprises the steps of:

a) applying said polymeric matrix sheet on its first surface to said vehicle substrate body part;

b) subjecting said polymeric matrix sheet to heat to shrink said sheet so as to conform to said vehicle substrate body part; and c) effecting the activation and curing of said adhesive with heat and UV light so as to affix it permanently thereto.

Drawing Description:

BRIEF DESCRIPTION OF THE DRAWING

The present invention is further described with reference to the accompanying drawing in which.

DETAILED DESCRIPTION

Figure 1:
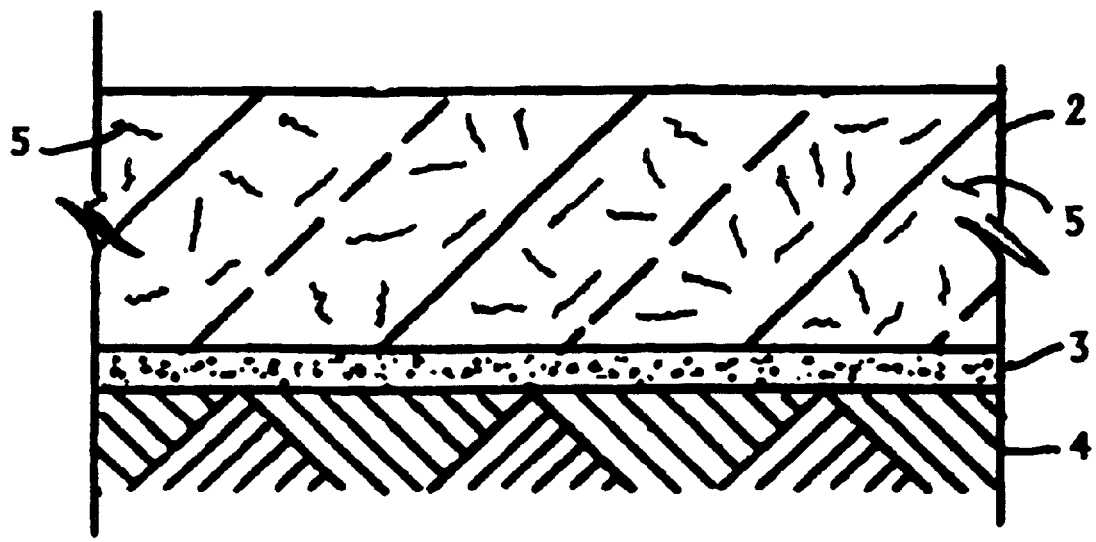
FIG. 1 is a vertical cross sectional view, in fragment, showing the preferred embodiment of the conformable coating composite described herein.

FIG. 1. shows a conformable coating composite comprising:
a) a heat shrink polymeric substantially transparent matrix sheet(2) having first and second major surfaces;
b) wherein said polymeric matrix sheet(2) is embedded with and envelopes low signature functional material(5) within said polymer matrix sheet(2);
c) wherein the first surface of said polymeric matrix sheet (2) possesses a transfer coated permanent adhesive layer(3).

The vehicle substrate(4) is an automobile, ground vehicle, marine vessel, and aerospace body part. The polymeric matrix sheet(2), which is a thermo-mechanically worked matrix sheet, possesses a layer thickness within the range of 0.15 to 2.0 mm. This transfer coated adhesive layer(3) possesses a thickness within the range of 0.1 to 0.8 mils.

DESCRIPTION OF THE PREFERRED EMBODIMENT

The preferred embodiment of this invention is a conformable coating composite containing carbon filaments.

The preferred embodiment of this invention is as a coating affixed to an aerospace body part as the vehicle substrate.

The composition of the composite comprises a polyurethane, a polyester, and a polyolefin matrix sheet which possesses a preferred layer thickness within the range of 1.0 to 2.0 mm. Some examples of the polyolefin include a homopolymer of an -olefin, such as ethylene, propylene, and butene, a copolymer of two or more -olefins, and a copolymer of one or more -olefins with another monomer, such as vinyl acetate or methyl methacrylate. The preferred embodiment of the present invention is as a coating with the thermo-mechanically worked matrix sheet being comprised of an aliphatic polyurethane.

The polymeric matrix sheet is embedded with 1 to 10 percent by weight of fine diameter carbon-containing material filaments, with the preferred figure being 3.0 to 4.0 percent by weight. These carbon-containing material filaments are derived from rayon, polyacrylonitrile (PAN), and pitch. Commercially available sources include Hercules, Inc. (AS-4, AS-6, IM-6 and HMS-4), Union Carbide (P-55, P75, P-100 and Thornel 75), and Celanese (GY-70). The preferred diameter of these carbon filaments falls within the range of 5 to 40 microinches.

The polymeric matrix sheet is embedded with 0.5 to 5.0 percent by weight of a pigment, with the preferred figure being 0.5 to 1.0 percent by weight. Some examples of the organic pigment that may be suitably used in the present invention include quinacridone(Pig Red 122, Ferro Corp.), diarylide yellow(Pig Yell 127, Holland Colors Americas), phthalocyanine blue(Pig Blue 15, BASF Corp.), phthalocyanine green, azo condensate, azoic brown(Pig Br 25 and Pig Br 32, Holland Colors Americas), disazo(Pig Br 23, Holland Colors Americas), and carbon black(Pig Blk 7, Holland Colors Americas). Some examples of the inorganic pigment that may be suitably used in the present invention include titanium dioxide(Pig White 6, Holland Colors Americas), iron oxide(Pig Red 101, Holland Colors Americas), ultramarine blue(Pig Blue 29, BASF Corp.), zinc ferrite(Pig Br 31 and Pig Yell 119, BASF & Holland Colors Americas), chrome titanate(Pig Br 24 and Pig Br 163, BASF & Holland Colors Americas), iron oxide (Pig Br 6, Holland Colors Americas), manganese/antimony/titanium oxide(Pig Yell 164, BASF & Holland Colors Americas), metallic oxide browns(Pig Br 33 and Pig Br 39, Holland Colors Americas), chromium oxide(Pig Gr 17, Holland Colors Americas), and titanium pigments(Pig Gr 26 and Pig Gr 50, BASF & Holland Colors Americas). The organic pigment that is preferably used for the conformable coating composite containing carbon filaments is carbon black(Pig Blk 7, Holland Colors Americas).

The transfer coated adhesive layer superimposed on the first surface of the polymeric matrix sheet is selected from the following: 1-epoxy; 2-epoxy-alkyl ester; 3-epoxy bisphenol A-based; 4-furan resin; 5-melamine formaldehyde; 6-phenol formaldhyde; 7-phenol formaldehyde-resorcinol formaldehyde; 8-phenolic; 9-phenolic-epoxy resin; 10-polyester; 11-polyethylene imine; 12-polyisocyanate; 13-polyurethane; 14-resorcinol formaldehyde; 15-silicone resin; 16-urea formaldehyde; 17-urea formaldehyde-melamine formaldehyde. The preferred adhesive is an epoxy with a thickness of about 0.5 mils.

Precursors (monomers, oligomers) are applied to the first surface of the polymeric matrix sheet from which a (polymeric) adhesive is formed by irradiation with UV light. The adhesive is therefore also a material which can be cured or activated by UV light.

DESCRIPTION OF OTHER EMBODIMENTS

Another embodiment of this invention is a conformable coating composite containing LCD light-shutter packets.

The vehicle substrate is a ground vehicle body part.

The preferred composition of the composite comprises a thermo-mechanically-worked matrix sheet of polyethylene terephthalate which possesses a preferred layer thickness within the range of 1.0 to 2.0 mm.

The polymeric matrix sheet preferably envelopes 6% to 12% by weight of a rectilinear array of packets of liquid crystal material. Flexible wiring embedded in the polymer matrix is fed by strips on an edge of the sheet. Each packet is addressable by hard wiring just as pixels are on an active matrix display. Additionally each LCD packet is divided into small interconnected cells for surface integrity of the gelled liquid.

The preferred adhesive is an epoxy with a thickness of about 0.5 mils.

A facile means of retrofitting the conformable coating composite onto a vehicle substrate comprises the steps of:
a) applying said polymeric matrix sheet on its first surface to said vehicle substrate body part;
b) subjecting said polymeric matrix sheet to heat to shrink said sheet to conform to said vehicle substrate body part; and
c) effecting the activation and curing of said adhesive with heat and UV light to affix it permanently thereto.

The polymeric matrix sheet can be applied to vehicle body parts ranging in size from 2–3 square feet up to 1000 square feet. This procedure is ideally suited to the retrofitting of the vehicle in the field. A heat gun serves as the source of heat to shrink the sheet to conform to the vehicle substrate body part. The same heat source is then used to effect the activation and curing of the adhesive. The Tg of the polymeric matrix sheet is sufficiently lower than the heat activation temperature of the adhesive to allow for ease of attaching the polymeric matrix sheet onto the vehicle substrate body part before it is permanently affixed in place.

A means of retrofitting the conformable coating composite onto a vehicle substrate comprises the steps of:

(a) precoating said vehicle substrate body part with a catalyst for adhesive activation.
(b) applying said polymeric matrix sheet on its first surface to said vehicle substrate body part;
(c) subjecting said polymeric matrix sheet to heat to shrink said sheet so as to conform to said vehicle substrate body part; and
(d) effecting the activation and curing of said adhesive with heat and UV light to affix it permanently thereto.

Epoxy resins for adhesive use are generally supplied as liquids or low melting temperature solids. They can be cured by a variety of curing procedures, including admixture with the stoichiometric proportion of polyfunctional primary amine: Diethylenetriamine(DEH 20, Dow Chemical Co.), Methylenedianiline(Hardener HT 972, Ciba-Geigy Corp.) and 4,4'-Diaminodiphenyl sulfone(Hardener HT 976, Ciba-Geigy Corp.). Accelerators for curing and activation of the epoxy adhesive include: Dicyandiamide(DICY, Pacific Anchor Chemicals), Boron trifluoride-monoethyl amine (BF3-MEA, Harshaw/Filtrol) and 2-Ethyl-4-methyl imidazole(EMI-24, BASF/Air Products). The preferred epoxy resin admixture curing aid is diethylenetriamine(DEH 20, Dow Chemical Co.) and the preferred accelerator for activating the epoxy adhesive is 2-ethyl-4-methyl imidazole (EMI-24, BASF/Air Products).

EXAMPLE 1

The Conformable Coating Composite Containing Carbon Filaments

The vehicle substrate is the Boeing B-52 Stratofortress.

The composition of the conformable coating composite comprises a thermo-mechanically worked matrix sheet of aliphatic polyurethane(TEXIN 5370, Bayer Corp.) which possesses a preferred layer thickness within the range of 1.0 to 2.0 mm.

The polyurethane matrix sheet is embedded with 3.0 to 4.0 percent by weight of fine diameter carbon-containing material filaments, commercially available from Celanese (GY-70). The preferred diameter of these carbon filaments falls within the range of 5 to 40 microinches.

The polyurethane matrix sheet is embedded with 0.5 to 1.0 percent by weight of a pigment. The organic pigment that is suitably used in this case is carbon black(Pig Blk 7, Holland Colors Americas).

The transfer coated adhesive layer superimposed on the first surface of the polyurethane matrix sheet is an epoxy (EPON 58005, Shell Chemical Company), with a thickness of about 0.5 mils. This adhesive is utilized with a flexibilizer (HELOXY Modifier 84, Shell Chemical Company) and curing agent(EPI-CURE Curing Agent 9360, Shell Chemical Company).

EXAMPLE 2

The Conformable Coating Composite Containing LCD Light-Shutter Packets

The vehicle substrate is the Abrams battle tank produced by General Dynamics.

The composition of the conformable coating composite comprises a thermo-mechanically worked matrix sheet of polyethylene terephthalate which possesses a preferred layer thickness within the range of 1.0 to 2.0 mm. Polyethylene terephthalate(PET) is available as Rynite from Dupont.

The polyethylene terephthalate matrix sheet envelopes ten percent by weight of packets of liquid crystal material (Merck-Industrial Chemical Division) arranged in a rectilinear array of LCD packets connected by flexible wiring means.

The transfer coated adhesive layer superimposed on the first surface of the polyethylene terephthalate matrix sheet is an epoxy(EPON 58901, Shell Chemical Company), with a thickness of about 0.5 mils. This adhesive is utilized with a flexibilizer(HELOXY Modifier 84, Shell Chemical Company) and curing agent(EPI-CURE Curing Agent 9360, Shell Chemical Company).

What is claimed is:

1. A conformable coating composite for attachment to vehicle substrates comprising:

a heat shrink polymeric substantially transparent matrix sheet having first and second major surfaces; wherein
said polymeric matrix sheet envelopes low signature materials within said polymeric matrix sheet;
wherein said first surface of said polymeric matrix sheet possesses a transfer coated permanent adhesive layer;
and wherein said low signature material is a rectilinear array of LCD packets connected by flexible wiring means.

2. The conformable coating composite for vehicle substrates of claim 1, wherein said vehicle substrate is an automobile, ground vehicle, marine vessel, or aerospace body part.

3. The conformable coating composite of claim 1, wherein said low signature material additionally comprises fine diameter carbon-containing material filaments.

4. The conformable coating composite of claim 1, wherein said low signature material additionally comprises a metallic pigment selected from the group consisting of aluminum flake, copper bronze flake and metal oxide coated mica.

5. The conformable coating composite of claim 1, wherein said low signature material additionally comprises a nonmetallic colored pigment selected from the group consisting of titanium dioxide, iron oxide, chromium oxide, lead chromate, carbon black and the like and organic pigments such as phthalocyanine blue and phthalocyanine green.

6. The conformable coating composite of claim 1, wherein said adhesive layer is a thermosetting adhesive.

7. The conformable coating composite of claim 1, wherein said adhesive layer is a UV light activated adhesive.

8. A method of utilization of a conformable coating for retrofitting a permanent attachment onto a vehicle substrate comprising the steps of:

applying a first surface of a heat shrink polymeric substantially non-opaque matrix sheet having first and second surfaces to a vehicle substrate body part; wherein said polymeric matrix sheet envelopes a rectilinear array of LCD packets connected by flexible wiring means within said polymeric matrix sheet, said first surface of said polymeric matrix sheet possessing a transfer coated permanent adhesive layer;
subjecting said polymeric matrix sheet to heat to shrink said sheet so as to conform to said vehicle substrate body part; and
effecting the activation and curing of said adhesive with heat and UV light so as to affix it permanently thereto.

9. A method of utilization of said conformable coating composite according to claim 8 wherein prior to applying the surface of said polymeric matrix sheet to said vehicle substrate body part, said vehicle substrate body part is precoated with a catalyst for adhesive activation attainment.

* * * * *